United States Patent [19]

Burk et al.

[11] Patent Number: 4,916,186
[45] Date of Patent: Apr. 10, 1990

[54] IMPACT- AND WEATHER-RESISTANT THERMOPLASTIC POLYBLENDS

[75] Inventors: Raymond D. Burk, Wilbraham; Fred M. Peng; A. Hameed Bhombal, both of Longmeadow, all of Mass.

[73] Assignee: Monsanto Company, St. Louis, Mo.

[21] Appl. No.: 38,461

[22] Filed: Apr. 13, 1987

Related U.S. Application Data

[63] Continuation of Ser. No. 790,914, Oct. 24, 1985, abandoned.

[51] Int. Cl.⁴ ............................................. C08L 51/04
[52] U.S. Cl. ..................................... 525/71; 525/84; 525/85
[58] Field of Search .......................................... 525/71

[56] References Cited

U.S. PATENT DOCUMENTS

| | | |
|---|---|---|
| 3,000,867 | 9/1961 | Fisher ................................. 525/387 |
| 3,041,307 | 6/1962 | Baer . |
| 3,461,188 | 8/1969 | Baer . |
| 3,509,237 | 4/1970 | Aubrey . |
| 3,843,753 | 10/1974 | Owens . |
| 3,992,485 | 11/1976 | Kosugi et al. . |
| 4,430,478 | 2/1984 | Schmitt et al. . |
| 4,433,102 | 2/1984 | Brandstetter et al. . |
| 4,442,263 | 4/1984 | Brandstetter et al. . |
| 4,473,679 | 8/1984 | Falk et al. . |
| 4,510,287 | 4/1985 | Wu ...................................... 525/71 |
| 4,559,386 | 12/1985 | Wu ...................................... 525/71 |
| 4,585,832 | 4/1986 | Kokubo ................................ 525/71 |

FOREIGN PATENT DOCUMENTS 3149046 6/1983 Fed. Rep. of Germany .
2142034 8/1984 United Kingdom .

Primary Examiner—Jacob Ziegler
Attorney, Agent, or Firm—Michael J. Murphy; William J. Farrington

[57] ABSTRACT

Thermoplastic polyblends having weatherability and impact strength are formed by blending a first graft copolymer containing a conjugated diene rubber substrate having a weight average particle size between about 0.6 and about 10 microns with a second graft copolymer containing an EPDM-type rubber substrate having a weight average particle size between about 0.05 and about 1 micron or an alkyl acylate rubber substrate having a weight average particle size between about 0.05 and about 0.5 micron. The superstrate of the two graft copolymers comprises a monovinylidene aromatic hydrocarbon and an unsaturated nitrile.

7 Claims, 3 Drawing Sheets

IMPACT- AND WEATHER-RESISTANT THERMOPLASTIC POLYBLENDS

This is a continuation of application Ser. No. 790,914, filed Oct. 24, 1985, now abandoned.

BACKGROUND OF THE INVENTION

This invention relates to thermoplastic polyblends which offer both weatherability and impact strength and to a process for making such compositions.

Thermoplastic compositions with good impact strength are known and may be prepared by grafting vinyl monomers, such as styrene and acrylonitrile, onto a diene rubber, such as polybutadiene. There are sufficient unsaturation sites in the double bonds remaining in such dienes following polymerization of the diene to form the rubber to provide both crosslinking of the rubber and grafting of the vinyl monomers to the rubber. In polymers made with such diene rubbers, however, a problem occurs in that unsaturation sites remain in the polymer following polymerization which appear to result in poor weatherability of the polymer, as they are subject to attack by light and oxygen. Weatherability, as used in describing this invention refers to the ability to retain the composition's desirable physical properties, including its strength, on exposure to environmental effects such as high temperature, ultra-violet light, high humidity and rain and other elements generally included in discussions of weatherability.

Thermoplastic compositions with good weatherability are also known and are typically prepared by substituting a saturated rubber for the diene rubber. These compositions, however, lack strength when compared to ones made with a conjugated diene and having the same amount of rubber.

It is also recognized in the art that blending of two different particle size graft rubber copolymers, such as is taught in U.S. Pat. No. 3,509,237, provides a combination of high impact strength, good gloss, and good tensile properties.

It would be desirable in the art to have available a thermoplastic polyblend which would provide both good weatherability and strength.

SUMMARY OF THE INVENTION

It is an object of the present invention to provide a novel polyblend of graft rubber copolymers with an interpolymer comprising a monovinylidene aromatic hydrocarbon and an unsaturated nitrile which exhibits a highly desirable balance of properties.

It is a further object to provide such a polyblend which is relatively easily and economically formulated and which may be readily tailored to provide specific properties for different applications.

It is another object to provide such a polyblend which has improved impact and weatherability properties.

The foregoing and related objects and advantages are obtained by providing a polyblend, comprising: (1) a first graft copolymer comprising a first substrate and a first superstrate wherein said first substrate comprises a conjugated diene rubber having a weight average particle size diameter, $D_w$, between about 0.6 and about 10 microns and wherein said first superstrate comprises a monovinylidene aromatic hydrocarbon and an unsaturated nitrile; and (2) a second graft copolymer comprising a second substrate and a second superstrate wherein said second substrate comprises a saturated rubber selected from the group consisting of an ethylene-propylene diene monomer (EPDM) rubber having a weight average particle size diameter, $D_w$, between about 0.05 and about 1 micron, an alkyl acrylate rubber having a weight average particle size diameter, $D_w$, between about 0.05 and 0.5 micron, and mixtures thereof, and wherein said second superstrate comprises a monovinylidene aromatic hydrocarbon and an unsaturated nitrile; and wherein said polyblend contains from about 5 to about 40 weight % total rubber; and wherein the weight ratio of said conjugated diene rubber to said saturated rubber is between about 5:95 and about 30:70, preferably between about 10:90 and about 20:80. When the first graft copolymer provides more than about 30 wt. % of the total rubber, the percent IDI retention (hereinafter defined) after accelerated UV exposure drops dramatically. Preferably the ratio of the particle size diameter, $D_w$, of the diene rubber to that of the saturated rubber is greater than about 1:1. The resulting polyblend may optionally be further blended with an interpolymer comprising a monovinylidene aromatic hydrocarbon and an unsaturated nitrile to achieve the desired levels of the various polyblend components.

The ratio of monovinylidene aromatic hydrocarbon to unsaturated nitrile in the superstrate of the first and second graft copolymers and the interpolymer is preferably from about 90:10 to about 30:70 and more preferably, about 80:20 to about 60:40.

By providing such a polyblend, improved impact strength is achieved at a lower total rubber level than when all the rubber is provided by the weatherable EPDM or alkyl acrylate rubber. Further, the impact strength upon weathering is not adversely affected by the presence of the diene rubber and, in fact, the weatherability is improved. This is surprising because it would be expected that the byproducts resulting from the deteriorating conjugated rubber graft copolymer would adversely affect the weatherability of the saturated rubber graft copolymer.

DETAILED DESCRIPTION

The First Graft Copolymer Rubber

Figure 1:
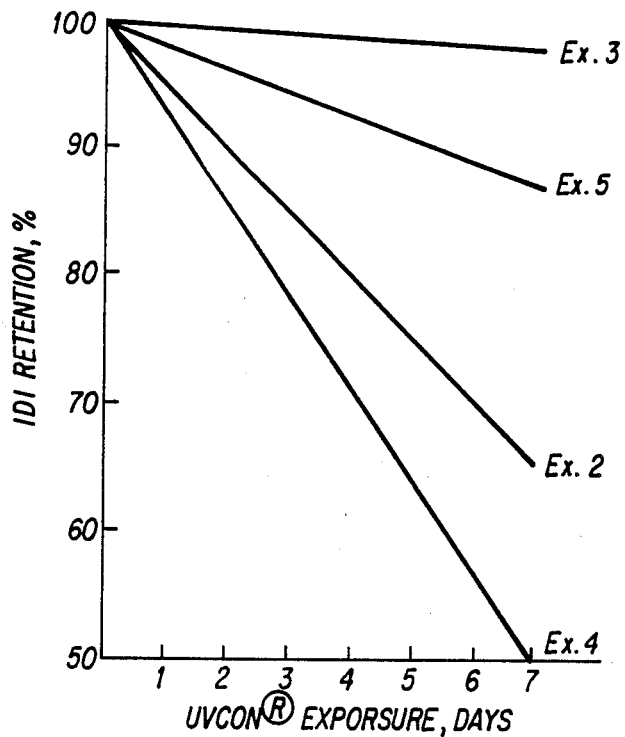
FIGS. 1, 2, and 3 are graphical illustrations comparing the performance of polyblends of the invention with those outside the invention.

Conjugated diene rubbers or mixtures of such rubbers which are suitable for use in the first graft copolymer have a second order transition temperature not higher than 0° C., preferably not higher than −20° C., as determined by ASTM Test D-746-52T. Such rubbers are formed by the polymerization of one or more conjugated, 1,3-dienes, e.g., butadiene, isoprene, chloro-1,3 butadiene, 1-chloro-1,3 butadiene, piperylene, etc. Such rubbers include copolymers and block copolymers of conjugated 1,3-dienes with up to an equal amount by weight of one or more copolymerizable monoethylenically unsaturated monomers, such as monovinylidene aromatic hydrocarbons (e.g. styrene; an aralkylstyrene, such as the o-, m- and p-methylstyrenes, 2,4 dimethylstyrene, the arethylstyrenes, p-methyl styrene, etc.; vinyl napthalene, etc.); arhalo monovinylidene aromatic hydrocarbons (e.g. the o-, m- and p-chlorostyrene, etc.); acrylonitrile; methacrylonitrile; alkyl acrylates (e.g. methyl acrylate, butyl acrylate, 2-ethylhexyl acrylate, etc.), the corresponding alkyl methacrylates; acrylamides (e.g. acrylamide, methacrylamide, N-butylacrylamide, etc.); unsaturated ketones (e.g. vinyl methyl ketone, methyl isopropenyl ketone, etc.); alpha-olefins (e.g. ethylene, propylene, etc.); pyridines; vinyl esters (e.g. vinyl acetate, vinyl stearate, etc.); vinyl and vinylidene halides (e.g. the vinyl and vinylidene chlorides and bromides, etc.); and the like.

Although the rubber may contain up to about 2 wt. % of a crosslinking agent, based on the weight of the rubber-forming monomer or monomers, crosslinking may present problems in dissolving the rubber in the monomers for the graft polymerization reaction. In addition, excessive crosslinking can result in loss of the rubber characteristics.

A preferred group of rubbers are the stereospecific polybutadiene rubbers formed by the polymerization, of 1,3-butadiene. These rubbers have a cis-isomer content of about 30–98% and a trans-isomer content of about 70–72% and generally contain at least about 85% of polybutadiene formed by 1,4 addition with no more than about 15% by 1,2 addition. Mooney viscosities of the rubber (ML-4, 212° F.) can range from about 20 to 70 with a second order transition temperature of from about −50° C. to −105° C. as determined by ASTM Test D-746-52T.

The Second Graft Copolymer Rubber

EPDM (Ethylene-Propylene-Diene-Monomer) type rubbers, alkyl acrylate rubbers, or mixtures thereof, are suitable for use in the second graft copolymer.

The EPDM-type rubbers are made from alpha-monoolefins having the formula $CH_2=CHR$, in which R may be hydrogen atom or a saturated alkyl radical, such as methyl, ethyl, n-propyl, iso-propyl, etc. Preferred rubbery copolymers are those in which the alpha-monoolefins used are ethylene and propylene, the weight ratio of ethylene monomer units to propylene monomer units in the copolymer being from 20/80 to 80/20, preferably between 35/65 and 65/35. The diene monomer component of the rubbery copolymer comprises non-conjugated straight-chain or cyclic diene hydrocarbons which are copolymerizable with the alpha-monoolefins. Examples of such components are straight or branched chain diolefins, such as those in which both double bonds are terminal as in 1,4-pentadiene, 1,5-hexadiene, 2-methyl-1,5-hexadiene, 3,3-dimethyl-1,5-hexadiene, 1,7-octadiene, 1,9-decadiene, 1,19-eicosadiene, and the like, diolefins in which only one double bond is terminal such as 1,4-hexadiene, 1,9-octadecadiene, 6-methyl-1,5-heptadiene, 7-methyl-1,5-octadiene, 11-ethyl-1,11-tri-decadiene and the like. Also suitable are the bridged-ring diene hydrocarbons of similar nature, especially those containing a methano or an ethano bridge, for example: (a) unsaturated derivatives of bicyclo [2,2,1] heptane containing at least two double bonds, including bicyclo [2,2,1] hepta-2,5-diene, 5-methylene-2-norbornene, 5-ethylidene-2-norbornene; dicyclopentadiene (also named 3a4,7,7a-tetrahydro-4,7-methanoindene), tricyclopentadiene, and tetracyclopentadiene; (b) unsaturated derivatives of bicyclo [2,2,2] octane containing at least two double bonds, including bicyclo [2,2,2] octa-2,5-diene; (c) unsaturated derivatives of bicyclo [3,2,1] octane containing at least two double bonds; (d) unsaturated derivatives of bicyclo [3,2,2] nonane containing at least two double bonds, and the like. The norbornenes are preferred. The concentration of the diene monomer component may range from about 1 to about 20 wt. % of the copolymer rubber.

Methods for making these rubbery copolymers are well known, and need not be described here (see e.g., U.S. Pat. Nos. 3,000,866; 3,000,867; 2,933,480 incorporated herein by reference).

The alkyl acrylate rubbers used in this invention comprise crosslinked acrylic polymers or copolymers having a glass transition temperature, Tg, preferably less than 0° C. which can be polymerized by free radical initiated emulsion techniques. Cross-linking of these particles allows them to retain their size and shape during subsequent polymer processing steps. Inclusion of a polyfunctional ethylenically unsaturated monomer during polymerization facilitates crosslinking. Crosslinked rubber is substantially insoluble in organic solvents such as tetrahydrofuran and cyclohexanone at ambient temperatures.

Examples of acrylic rubbers that can be used include the crosslinked polymers of the $C_2$–$C_{10}$ alkyl acrylate and the $C_8$–$C_{22}$ alkyl methacrylate monomers, preferably the $C_4$–$C_8$ alkyl acrylates, such as poly (2-ethylhexyl acrylate). At least one acrylate monomer is utilized in this step. If desired, the monomer charge may contain small amounts, i.e., 1 to 20 wt. % of the amount of acrylate monomer, of optional monomers including styrene, acrylonitrile, methacrylonitrile, methyl methacrylate, methacrylic acid, acrylic acid, vinylidene chloride, vinyl toluene acrylate monomer.

In order to crosslink the acrylate monomer from about 0.05 to about.10 wt. %, preferably 0.1 to 5 wt. %, based on the weight of acrylate monomer of at least one crosslinking agent is used during polymerization. For purposes of this invention, such crosslinking agent should be a di- or polyfunctional ethylenically unsaturated monomer having at least one vinyl group of the formula: $H_2C=CR$—wherein R is hydrogen or lower alkyl. As is well known in the art the vinyl groups on the crosslinking monomer can be the same (e.g., divinyl benzene, trimethylol propane triacrylate, etc.) or different, (e.g., allyl methacrylate, diallyl fumarate, diallyl maleate, etc.) Examples of other suitable crosslinking agents which are known to persons in the art and which can be used are 1,3-butylene dimethacrylate, diethylene glycol dimethacrylate, ethylene glycol dimethacrylate, trimethylolpropane trimethacrylate, methylene bisacrylamide, diethylene glycol diacrylate, ethylene glycol diacrylate, divinyl ether, diallyl phthalate, divinyl sulfone, divinyl sorbitol, triethylene glycol dimethacrylate, trimethylene glycol diacrylate, butylene glycol diacrylate, butylene glycol dimethacrylate, pentamethylene glycol diacrylate, glyceryl triacrylate, octylene glycol diacrylate, trimethylolpropane triacrylate, the tetraacrylate ester of pentaerythritol and various diallyl phosphonates.

Optionally, a grafting agent may be used during polymerization formation of the acrylate rubber. Such agents have two or more addition polymerizable unsaturated reactive groups which participate in the polymerization reaction at substantially different rates. These agents and their application are more fully described in U.S. Pat. No. 3,843,753, column 5 line 11–column 9 line 17, which is incorporated herein by reference.

Optimum results are obtained by the use of a crosslinked copolymer containing from about 95 to 99.9 wt. % of n-butyl acrylate and from about 0.1 to 5 wt. % of butylene glycol diacrylate.

The emulsifier which is used in polymerizing the alkyl acrylate is at least one of the following conventional types: an anionic emulsifier, e.g., the $C_2$–$C_{22}$ carboxylic acids, the sulfates or sulfonates of $C_6$–$C_{22}$ alcohols or alkyl phenols; a non-ionic emulsifier, e.g., the addition products of alkylene oxides to fatty acids, amines or amides; a combination of the foregoing anionic and non-ionic emulsifiers; or the cationic emulsifiers, e.g., a quaternary ammonium containing compound. The amount of emulsifier present should be from about 0.5 to about 5 wt. % in the emulsion.

An initiator is also present in the emulsion in an amount ranging from about 0.005 to 2 wt. % of the acrylate monomer. Suitable for use are water-soluble peroxidic compounds, e.g., hydrogen peroxide and alkali metal and ammonium persulfates, oil soluble organic peroxides and azo compounds, e.g., benzoyl peroxide, azobisisobutyronitrile and the like, used singly or in combination. Redox catalysts, e.g., mixtures of peroxidic catalysts with reducing agents, such as hydrazine, alkali metal bisulfites, thiosulfates, and hydrosulfites, and soluble oxidizable sulfoxyl compounds can also be used.

A chain transfer agent such as an alkyl mercaptan, e.g., t-dodecyl mercaptan, toluene, xylene, chloroform, halogenated hydrocarbons, terpinolene, and the like may also be used.

A buffer to keep the pH at 6.0 or higher is a final component of the emulsion.

Methods for making these acrylate copolymers are well-known and need not be described here (see, e.g., U.S. Pat. No. 3,944,631, incorporated herein by reference).

The Superstrate and Interpolymer

The monomers of the graft copolymer superstrate and of the ungrafted interpolymer comprise a monovinylidene aromatic hydrocarbon and an unsaturated nitrile, preferably such monovinylidene aromatic hydrocarbon and nitrile monomers comprise at least 50 wt. % and more preferably at least 75 wt. % of the graft superstrate and interpolymer. Most desirably, such monomers comprise at least 90% by weight of the graft superstrate and the interpolymer and the usual commercial compositions are substantially completely comprised of such monomers although minor amounts, i.e. less than 5 wt. % of other components, such as chain transfer agents, modifiers, etc. may be included.

As will be readily appreciated, the graft superstrate should be compatible with the interpolymer so as to obtain good properties which will require the presence of the similar monomers. Most desirably, the superstrate should closely approximate the chemical composition of the interpolymer so as to obtain matching of the chemical properties, and, accordingly, it is desirable that the superstrate of both graft copolymers closely approximate each other. In addition, it is believed that increased compatibility between the superstrate and the interpolymer is thereby obtained with commensurate improvement in chemical properties. However, it will be appreciated that deviations in the composition of the interpolymers and superstrates such as different monomers and/or ratios may be desirable for some applications.

Exemplary of the monovinylidene aromatic hydrocarbons which may be used in the superstrate and interpolymer are styrene; alpha-alkyl monovinylidene monoaromatic compounds, e.g. alpha-methylstyrene, alpha-ethylstyrene, alpha-methyl-vinyltoluene, alpha-methyl dialkylstyrenes, etc.; ring-substituted alkyl styrenes, e.g. vinyl toluene, o-ethylstyrene, p-ethylstyrene, 2,4-dimethyl-styrene, etc.; ring-substituted halostyrenes, e.g. o-chlorostyrene, p-chlorostyrene, o-bromostyrene, 2,4-dichlorostyrene, etc.; ring-alkyl, ring-halo-substituted styrenes, e.g. 2-chloro-4-methylstyrene, 2,6-dichloro-4-methylstyrene, etc.; vinyl naphthalene; vinyl anthracene, etc. The alkyl substituents generally have 1 to 4 carbon atoms and may include isopropyl and isobutyl groups. If so desired, mixtures of such monovinylidene aromatic monomers may be employed.

Exemplary of the unsaturated nitriles which may be used in the interpolymer are acrylonitrile, methacrylonitrile, ethacrylonitrile, and mixtures thereof.

Exemplary of the monomers which may be interpolymerized with the monovinylidene aromatic hydrocarbons and unsaturated nitriles are conjugated 1,3 dienes, e.g. butadiene, isoprene, etc.; alpha- or beta- unsaturated monobasic acids and derivatives thereof, e.g. acrylic acid, methyl acrylate, ethyl acrylate, butyl acrylate, 2-ethylhexyl acrylate, methyl methacrylate, methacrylic acid and the corresponding esters thereof, acrylamide, methacrylamide; vinyl halides such as vinyl chloride, vinyl bromide, etc.; vinylidene chloride, vinylidene bromide, etc.; vinyl esters such as vinyl acetate, vinyl propionate, etc.; dialkyl maleates or fumarates such as dimethyl maleate, diethyl maleate, dibutyl maleate, the corresponding fumarates, etc.

In addition, the monomer formulation at the time of commencement of polymerization may include a preformed polymer or a partially polymerized material such as a partially polymerized monovinylidene aromatic hydrocarbon or interpolymer thereof.

The polymerizable monomer mixtures of the graft copolymer superstrate and interpolymer preferably contain at least 20 wt. % of the monovinylidene aromatic monomer and more preferably at least 50 wt. % thereof. They also more preferably contain at least 5 wt. % of the unsaturated nitrile and more preferably at least 10 wt. % thereof. From the standpoint of highly advantageous commercial practice, the monomer formulations contain 20 to 95 wt. %, preferably 60 to 85 wt. % of the vinylidene aromatic hydrocarbon; and 80 to 5 wt. %, preferably 40 to 15 wt. %, of the unsaturated nitrile.

The ratio of monovinylidene aromatic hydrocarbon to unsaturated nitrile in the first and second graft superstrates and in the interpolymer of the final polyblend is preferably between 90:10 and 30:70 and more preferably between 80:20 and 60:40. Although the superstrates and interpolymer must be compatible, these ratios may vary in a given polyblend.

As is well known in the art, the graft copolymers are produced by polymerizing the monomers in the presence of the preformed rubber. It is believed that a portion of the polymer formed grafts onto the preformed rubber since it is generally not possible to extract the rubber from the polymerized mass with the usual rubber solvents although some of the rubber polymer may not be in actual chemical combination with the polymer.

Since 100% grafting efficiency is not usually attainable, at least a portion of the monomers polymerized in the presence of the preformed rubber will not chemically combine therewith so as to provide ungrafted superstrate for the graft copolymers. This portion may be increased or decreased depending upon the ratio of monomers to rubber, the particular monomer formulation, the nature of the rubber, and the conditions of polymerization. Generally, interpolymers prepared without the inclusion of rubber will be compounded with material from the graft polymerization reactions to obtain the desired composition.

Any of the usual polymerization processes may be used to effect polymerization of the interpolymer, i.e., mass, continuous mass suspension, mass-suspension and emulsion, or combinations thereof. Such techniques are well known and are also described herein with respect to the graft copolymerization reactions.

The molecular weight of the interpolymer also influences weatherability. Preferably the interpolymer should have a specific viscosity, $\eta_{sp}$, determined at 25° C. and a concentration of 0.8 g interpolymer per 100 ml methyl ethyl ketone, above about 0.4 and, more preferably, above about 0.45.

Formation of The First Graft Copolymer

The first graft copolymer constituting the conjugated diene rubber component of the blend of this invention is prepared by polymerizing monomers of the superstrate in the presence of the preformed rubber substrate, generally in accordance with conventional graft polymerization techniques involving suspension, emulsion or mass or continuous mass polymerization, or combinations thereof. Examples of such processes are disclosed in U.S. Pat. Nos. 3,509,237, 4,254,236, 4,417,030, incorporated herein by reference. A mass-suspension process, as disclosed in U.S. Pat. No. 3,509,237, column 6 line 11—column 7 line 10, or continuous mass process, as disclosed in U.S. Pat. No. 4,417,030, column 8 line 43—column 11 line 2, is preferred. In such graft polymerization reactions, the preformed rubber substrate generally is dissolved in the monomers and this admixture is polymerized to combine chemically or graft at least a portion of the monomers which form the superstrate upon the rubber substrate. Depending upon the ratio of these monomers to rubber substrate and polymerization conditions, it is possible to produce both the desired degree of grafting of the superstrate onto the rubber substrate and the polymerization of ungrafted superstrate at the same time.

Although the amount of superstrate grafted onto the rubber substrate may vary from as little as 10 parts by weight per 100 parts of substrate to as much as 250 parts per 100 parts, and even higher, the preferred graft copolymers have a superstrate-substrate ratio of about 30-200:100 and most desirably about 70-150:100. With graft ratios above 30:100, a highly desirable degree of improvement in various properties generally is obtained.

Generally, the particle size of the graft copolymer can be varied by varying the size of the rubber substrate employed. For example, a rubber latex which will usually have a relatively small particle size may be agglomerated or coagulated by convention techniques, such as by creaming through the use of polyvalent metal salts of a number of the small rubber particles into a larger mass. During the grafting reaction, the polymerizing monomers will graft onto this agglomerate and thus provide a graft copolymer of larger size. In addition, seeding techniques during polymerization of the rubber and/or during the polymerization of the graft copolymers may be utilized to vary the size of the particles thus produced. Heat and other conditions of polymerization such as catalysts, monomer ratios, rate of addition of monomers, etc., also tend to affect the particle size of the graft copolymers produced thereby.

Chain transfer agents or molecular weight regulators also exhibit an effect upon the size of the graft copolymer produced, particularly in mass and suspension polymerization reactions. The effect of the rate of addition of chain transfer agents will be referred to hereinafter. The viscosity of the polymerizing mixture also tends to affect the condensate particle size of the polymers.

To some extent, crosslinking and the ratio of the superstrate to substrate in the graft copolymer tend to affect the particle size of the graft copolymers by reason of an apparent tendency for the particles to aggregate or agglomerate as the amount of grafting and/or crosslinking becomes minor.

In practice, a mass-suspension or continuous mass polymerization process is utilized to form the larger particles since highly spherical particles are produced within a relatively narrow size range. Generally, the graft copolymerization inherently produces crosslinking, and this may be enhanced by selection of process conditions to ensure discreteness of the graft copolymer particles.

Formation of The Second Graft Copolymer

The EPDM graft copolymers may be formed by an suitable conventional method for making such graft copolymers. U.S. Pat. Nos. 3,489,822; 3,642,950; 3,819,765; and 3,849,518 disclose such methods and are incorporated herein by reference.

Graft polymerization of the superstrate onto the previously described acrylate rubbers to form the alkyl acrylate graft copolymers may be by any conventional emulsion polymerization process. Generally the alkyl acrylate monomer is emulsion polymerized in the presence of from 0.05 to 10 wt. % of a polyfunctional crosslinking monomer such as hereinbefore described to form monomodal crosslinked acrylate rubber particles.

After formation of the polymeric rubber substrate, the monomers of the superstrate are then emulsion polymerized optionally in the presence of a second crosslinking agent which may be selected from the same group of agents as that for crosslinking the rubber. Finally additional monomers of the superstrate are polymerized without adding any additional crosslinking agent to provide ungrafted uncrosslinked superstrate. Such a process is described in more detail in U.S. Pat. No. 3,944,631, incorporated by reference herein.

Formation of The Blend

The two graft copolymers and, optionally, the interpolymer may be blended by various techniques. In the preferred techniques, the graft polymers are extrusion or Banbury blended or mill rolled with or without the addition thereto of additional interpolymer depending upon the amount of ungrafted superstrate in the feedstocks providing the rubber grafts and upon the total rubber graft content desired in the blend. Alternatively, a mixed latex of the first and second graft copolymer may be prepared and coagulated to provide crumb containing the rubber grafts of the desired two copolymers in the desired proportions.

Generally, the blends may contain 1 to 70 wt. % of the two rubber grafts combined. Increasing the total amount of rubber graft while maintaining the ratio of first graft to total graft constant generally increases the Izod impact strength of the composition but rapidly increases the viscosity of the blend and decreases the tensile strength. Accordingly, the preferred blends contain about 5 to 40 wt. % of the combined rubber grafts, and most desirably about 10 to 35 wt. %.

Since it is desirable to obtain a balancing of properties and the size of the first graft copolymer rubber particles generally has the most significant effect upon the properties at a constant total rubber content, the preferred compositions contain a smaller ratio of the first graft to total graft as the particle size thereof increases. Generally the weight ratio of first graft rubber to second graft rubber should be between 5:95 and 30:70, preferably between 10:90 and 20:80.

It will be readily appreciated that optional components may be added to the composition depending upon the intended use and nature thereof, such as, for example, fillers and pigments. Generally, it is necessary to incorporate stabilizers and antioxidants to prevent degradation of the graft copolymer and oftentimes of the interpolymer of the matrix. Although the stabilizers and antioxidants may be incorporated at the time of final blending, generally it is most advantageous to incorporate these components into the graft copolymers after they are formed so as to minimize any tendency for degradation or oxidation during processing and storage.

The present process permits the two graft copolymers to be prepared separately and the interpolymer to also be prepared separately with the several components being storable for extended periods of time and blended only as required to form the desired composition. Thus, the rubber level or the balance of properties can be varied by selection of readily variable percentages of the several components.

Analytical Procedures

Figure 2:
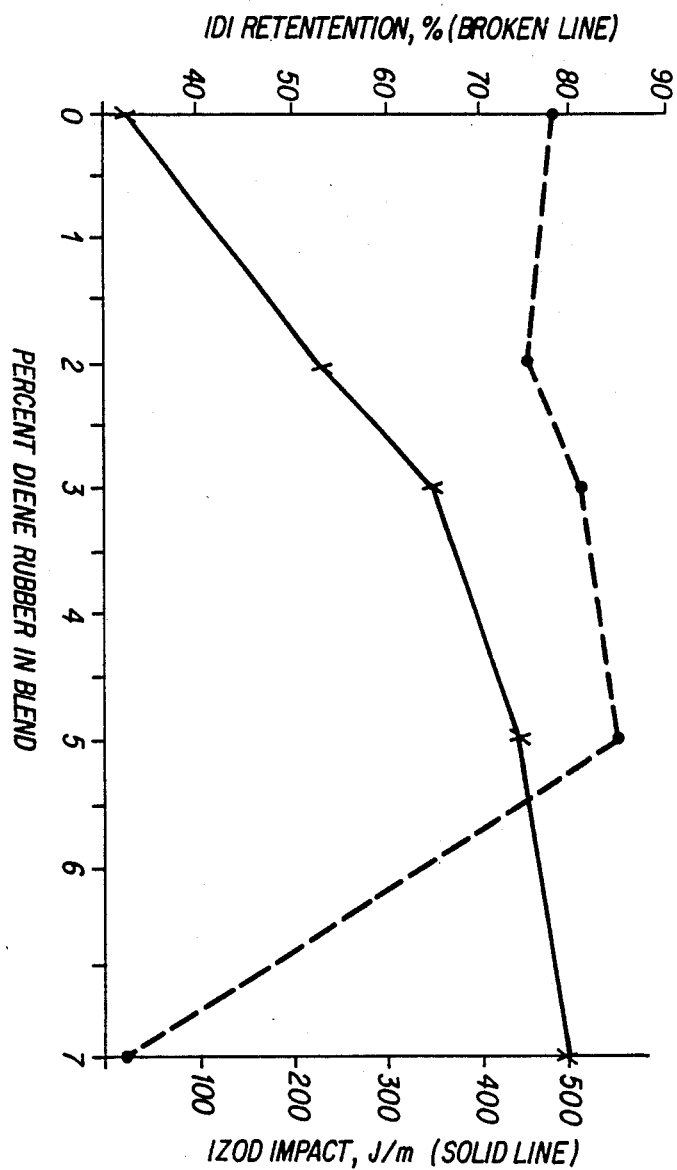
Figure 3:
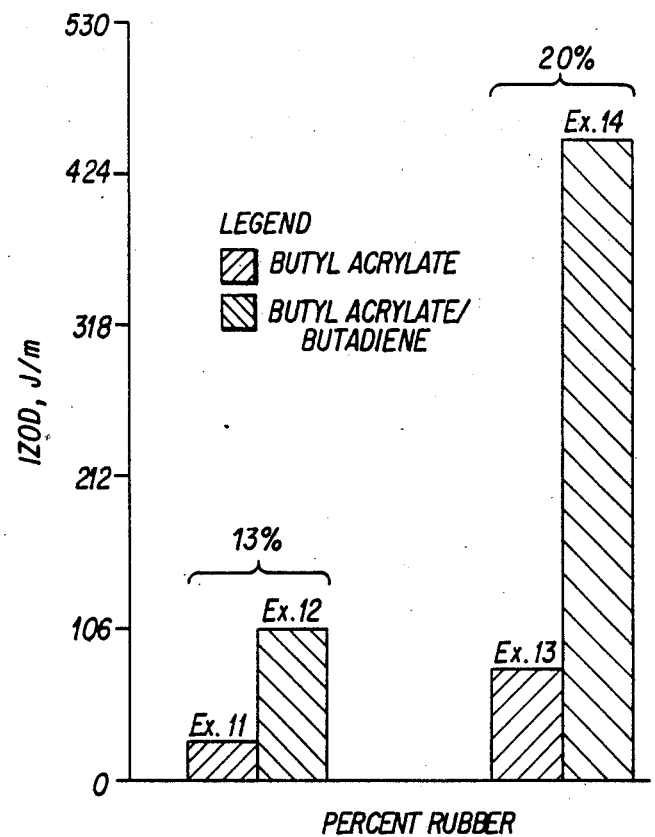

The following tests were conducted on injection molded specimens prepared according to the following specific examples, Examples 1–14, and the results of the tests are displayed in Table I and FIGS. 1–3. All specimens were conditioned in a constant temperature of 21°±2° C. and relative humidity of 50±2%, for at least 16 hours prior to testing.

1. Inverted Dart Impact (IDI): A dart with a hemispherical head of 0.013 meter diameter was used against which the specimen was driven at a constant speed of 1.86 meters/sec.

2. Notched Izod Impact (J/m notch): ASTM D-256-84.

3. Specific Viscosity ($\eta_{sp}$): The specific viscosity was measured in methyl ethyl ketone at 25° C. and at a polymer concentration of 0.8 g/100 ml solvent.

4. Particle Size (microns): Both weight average particle diameter, $D_w$, and number average particle size diameter, $D_n$, as discussed herein were measured using a photosedimentometer and the published procedure of Graves, M. J. et al., "Size Analysis of Subsieve Powders Using a Centrifugal Photosedimentometer," British Chemical Engineering 9:742–744 (1964). A Model 3000 Particle Size analyzer from Technidyne Corp., 100 Quality Ave., New Albany, Ind. was used to determine the weight average particle sizes described herein with the use of appropriate light scattering Mie theory to interpret the data.

5. Percent Gel: The samples were dispersed in methylethyl ketone, then centrifuged to precipitate the gel; the supernatent liquid was then removed and the gel dried. The weight of the dry gel was used to calculate the graft level, using he rubber content in the sample. This method is similar to that described in the following references: B. D. Gesner, "Phase Separation of Some Acrylonitrile-Butadiene-Styrene Resins," J. Poly. Sci.: Pt A, 3, 3825–3831 (1965); and L. D. Moore et al, "Molecular Structure Analysis of Graft Polymers," App. Poly. Sym., 7, 67–80 (1968).

6. IDI Retention: Samples were exposed using an Atlas UVCON ™ Ultra-Violet/Condensation Screening Device. Samples were subjected to the following cycle for 7 and 14 days: exposed for 8 hours at 70° C., then left in the dark for 4 hours at 55° C. at high humidity, then heated for 30 min. The Atlas UVCON ™ screening device has 2 banks of four F540 UVB fluorescent sunlamps, each 4 feet long, which are rotated once every 400 hours and replaced at the rate of one bulb per cycle. IDI was measured before and after exposure to determine the percent retained. This accelerated test predicts the long-term weatherability of the polyblends.

CONTROL EXAMPLE 1

This Example illustrates preparation of a prior art polyblend of two different graft copolymers each containing a diene rubber but having different particle sizes.

Part A

Preparation of the Small Particle Size Graft Copolymer

To 100 parts of a latex of butadiene/acrylonitrile copolymer (93:7) containing 48 percent solids and approximately 3 parts of rubber reserve soap as an emulsifier were added 100 parts water, 0.4 part rubber reserve soap and 0.61 part potassium persulfate.

This emulsion was heated to 80° C. with stirring and then were added thereto over a period of about three hours, 43 parts styrene, 18.5 parts acrylonitrile and 0.54 parts of terpinolene. The emulsion was held at temperature for one hour thereafter with stirring. It was then cooled, and the graft latex was then coagulated by the addition of magnesium sulfate and the coagulant was then washed and dried. The resultant rubber graft copolymer had a superstrate to substrate ratio of about 100:80 and a weight average particle size of about 0.18 micron.

Part B

Preparation of the First Graft Copolymer 12.6 parts of a soluble butadiene rubber obtained from Firestone Synthetic Rubber and Latex Company, Akron, Ohio as Diene 35 were dissolved in 26.0 parts of acrylonitrile and 55.6 parts styrene. The mixture was heated to 90° C. There was added thereto 0.02 part of t-butyl peracetate, 0.072 parts di-tert-butyl peroxide, 0.11 parts of terpinolene as a chain transfer agent and stabilizers. The mixture was stirred and held at 90° C. over a period of approximately 4 hours, at the end of which time an additional 0.66 part of terpinolene was added.

At 23 percent conversion of the monomers, the partially polymerized syrup was dispersed in 120 parts water to which was added 5.1 parts styrene and, as a suspending agent, 0.07 part of a copolymer of acrylic acid and 2-ethylhexyl acrylate. The resulting suspension was stirred and heated to 150° C. to polymerize the remaining monomer over a period of 4 hours, then cooled, centrifuged, washed and dried to recover the rubber graft copolymer in the form of small spherical beads. The ratio of superstrate to substrate was about 100 to 14.5 and the weight average particle size of the rubber in the graft product was about 0.9 micron. The wt. % polymerized acrylonitrile in the ungrafted matrix copolymer prior to suspension was 25.6 while the overall wt. % acrylonitrile in the ungrafted matrix after suspension polymerization was complete was 27.4.

Part C

Preparation of Interpolymer

A liquid monomer stream of 67.5/32.5 parts styrene/acrylonitrile and 0.22 parts terpinolene were continuously charged for about 0.9 hour to a mixed reaction zone held at 168° C. which was maintained about 65 vol. % filled with liquid with the vapor phase of unreacted monomers above in substantial equilibrium with the liquid phase. The liquid phase was continuously removed, and devolatilized to provide a copolymer of 67.5/32.5 wt. % polymerized styrene/acrylonitrile.

Part D

Preparation of Polyblend

To a Banbury blender were added 37 parts of the rubber graft copolymer of Part A, 12 parts of the rubber graft copolymer of Part B, 57 parts of the interpolymer of Part C, 2 parts Irganox antioxidant, and sufficient Tinuvin ® P UV absorber to provide 1 to 1.5 wt. % and Tinuvin ® 770 light stabilizer to provide 0.2 to 0.5 wt. % in the final polyblend. All stabilizers are commercially available from Ciba-Geigy Corporation, Ardsley, N.Y. A polyblend composition was obtained containing about 20 parts of rubber with the rubber of the first graft copolymer providing about 15 wt. % of the total amount of rubber graft copolymers.

EXAMPLE 2

This Example is according to the invention and illustrates the improved weatherability obtained when 85 wt. % of the rubber (17 wt. % based on the total weight of the polyblend) is replaced by butyl acrylate rubber.

To form the polyblend of this Example containing a second graft copolymer containing an acrylate rubber in place of the copolymer formed in Part A of Example 1, the following were blended as in Part D of Example 1:
22 parts first graft copolymer formed in Part B
21 parts interpolymer formed in Part C
57 parts second graft copolymer, identified as GELOY ® 1120 butyl acrylate copolymer, commercially available from General Electric, Schenectady, N.Y.

Analysis of GELOY ® 1120 butyl acrylate copolymer yielded the following results: Rubber 27-32 wt. %; Acrylonitrile, 15-17 wt. %; Styrene, 51-58 wt. %; $\eta_{sp}$ 25°, 0.44-0.6 (0.8% in MEK); Gel, 45%; $M_w$, 122,000; $M_n$, 65,000; $D_w$, 0.14; $D_n$, 0.08. The graft copolymer is prepared by an emulsion process as disclosed in U.S. Pat. No. 3,944,631, and, to the best of our knowledge, divinylbenzene is used as the grafting and crosslinking agent for the styrene-acrylonitrile superstrate and butylene glycol diacrylate, as the crosslinking agent for the substrate. After accelerated weathering of the polyblend, obtained by 7 days UVCON ® exposure, the polyblend of this Example 2 retained a higher percent of its impact strength, measured as percent IDI retention, than that of Control Example 1. See Table I.

EXAMPLE 3

This Example is according to the invention and illustrates the improved weatherability obtained when 85 wt. % of the rubber (17 wt. % based on the total weight of the polyblend) is replaced by EPDM rubber.

To form the polyblend of this Example containing a second graft copolymer containing an EPDM-type rubber in place of the copolymer formed in Part A of Example 1, the following were blended as in Part D of Example 1:
22 parts first graft copolymer formed in Part B
15 parts interpolymer formed in Part C
63 parts second graft copolymer identified as ROVEL ® 701 EPDM copolymer, commercially available from Dow Chemical Company, Midland, Mich.

Analysis of ROVEL ® 701 EPDM copolymer yielded the following results: Rubber, 25-30 wt. %; Acrylonitrile, 20-23 wt. %; Styrene, 47-55 wt. %; $\eta_{sp}$ 25°, 0.52 (0.8% in MEK); Gel, 32-33%; $M_w$, 114,000; $M_n$, 57,000-67,000; $D_w$, 0.84; $D_n$, 0.25. The graft copolymer is prepared by either a solution or solution-suspension process, as disclosed in U.S. Pat. Nos. 3,489,822 and 3,819,765, and, to the best of our knowledge contains 5-ethylidene-2-norbornene as the diene monomer. After accelerated weathering of the polyblend, obtained by 7 days UVCON ® exposure, the polyblend of Example 3 retained a higher percent of its impact strength, measured as percent IDI retention, than that of Control Example 1. See Table I.

CONTROL EXAMPLES 4 AND 5

These Control Examples are not according to the invention and are included to illustrate the substantial increase in impact strength achieved in Examples 2 and 3 when a small amount, 3 wt. %, polybutadiene rubber is added.

To prepare the polyblend of Control Examples 4 and 5 containing only second graft copolymer containing saturated rubber and styrene-acrylonitrile interpolymer the method described in Examples 2 and 3 were used but the first graft copolymer of Part B containing diene rubber was omitted, and sufficient interpolymer was added to provide about 17 parts saturated rubber per 100 parts polyblend.

Izod impact strengths of the polyblends of Examples 2 and 3 when compared with those of Control Examples 4 and 5 were substantially higher. See Table I. Also illustrated is the unexpected retention of weatherability. Percent IDI retention after UVCON ® exposure for Examples 2 and 3 is greater than that for Control Examples 4 and 5. See Table I. Because impact strength after 14, or even 7, days UVCON ® exposure would not be attributed to the 3 wt. % polybutadiene rubber, which deteriorates rapidly under such conditions, it would be expected that the percent IDI retention for Examples 2 and 3 would, at best, be equal to that of Control Examples 4 and 5, since all the Examples contain 17 wt. % saturated, weatherable, rubber, and more likely be less due to attack by polybutadiene decomposition byproducts. These unexpected results are further illustrated in FIG. 1.

FIG. 1 illustrates the improved weatherability retention achieved by the addition of a polybutadiene graft copolymer. The graph compares the weatherability, measured as IDI retention upon 7 days UVCON ® exposure (hereinafter described), of the polyblend of Control Example 4, containing 17 wt. % n-butyl acrylate rubber (provided by GELOY ® 1120), with that of the polyblend of Example 2, containing 17 wt. % n-butyl acrylate rubber and 3 wt. % polybutadiene rubber and compares the weatherability of the polyblend of Control Example 5, containing 17 wt. % EPDM rubber (provided by ROVEL® 701), with that of the polyblend of Example 3, containing 17 wt. % EPDM rubber and 3 wt. % polybutadiene rubber. Following UVCON® exposure, the polyblends of Examples 2 and 3, containing 3 wt. % polybutadiene, have a greater IDI retention than those of Control Examples 4 and 5, containing only saturated, weatherable rubber.

EXAMPLES 6-10

In order to determine the optimum percent diene rubber to achieve good impact strength without sacrificing IDI retention, Examples 6-10 were prepared as in Example 2 but containing 0, 2, 3, 5 and 7 wt. % diene rubber respectively and a total rubber content of 20 wt. %. The results are displayed in Table I, and a graph of both IDI retention and Izod impact strength versus percent butadiene rubber are displayed in FIG. 2. The data indicate that saturated rubber, up to about 6 wt. % of the blend, can be replaced with a conjugated diene rubber without a substantial loss of impact strength following 7 days UVCON® exposure and that up to about 5 wt. % can be replaced without detectable loss following such exposure. The choice of amount of saturated rubber to replace with conjugated diene rubber will depend upon the balance of properties sought.

FIG. 2 illustrates, on the left hand axis, the decreased weatherability retention when more than about 20-23 wt. % of the total rubber (4-4.5 wt. % of the blend) is provided by the conjugated diene (polybutadiene) rubber and illustrates, on the right hand axis, the increased impact strength as the conjugated diene (polybutadiene) rubber content is increased.

EXAMPLES 11-14

Examples 11-14 further demonstrate the dramatic increase in Izod impact strength when only a small amount of the total wt. % rubber is replaced by a diene rubber.

Examples 11-14 were prepared according to the procedure in Example 2 except that the amounts of graft copolymers and interpolymers blended were adjusted so that Example 11 contained 13 wt. % butyl acrylate rubber, Example 12 contained 10 wt. % butyl acrylate rubber and 3 wt. % polybutadiene rubber, Example 13 contained 20 wt. % butyl acrylate rubber, and Example 14 contained 17 wt. % butyl acrylate rubber and 3 wt. % polybutadiene rubber. The results are displayed in Table I and in FIG. 3.

TABLE I

| Example | % Diene | % EPDM | % Acrylate | Izod* Impact | IDI** 7 days | IDI** 14 days |
|---|---|---|---|---|---|---|
| 1*** | 20 | 0 | 0 | 500 | 24 | — |
| 2 | 3 | 0 | 17 | 330 | 67 | 19 |
| 3 | 3 | 17 | 0 | 570 | 98 | 33 |
| 4*** | 0 | 0 | 17 | 42 | 49 | 7 |
| 5*** | 0 | 17 | 0 | 77 | 86 | 17 |
| 6*** | 0 | 0 | 20 | 33 | 78 | — |
| 7 | 2 | 0 | 18 | 230 | 76 | — |
| 8 | 3 | 0 | 17 | 350 | 82 | — |
| 9 | 5 | 0 | 15 | 440 | 84 | — |
| 10 | 7 | 0 | 13 | 490 | 42 | — |
| 11*** | 0 | 0 | 13 | 27 | — | — |
| 12 | 3 | 0 | 10 | 106 | — | — |
| 13*** | 0 | 0 | 20 | 80 | — | — |
| 14 | 3 | 0 | 17 | 450 | — | — |

*Notched (Joules/meter)
**Percent IDI retention after UVCON® exposure
***Control Examples

We claim:

1. A polyblend comprising:
   (I) a first graft copolymer comprising a first substrate and a first superstrate wherein said first substrate comprises a polybutadiene rubber having a weight average particle size diameter, $D_w$, between about 0.6 and about 10 microns and wherein said first superstrate comprises styrene and acrylonitrile in a ratio between about 80:20 and about 60:40; and
   (2) a second graft coplymer comprising a second substrate and a second superstrate wherein said second substrate comprises a saturated ethylene propylene non-conjugated diene rubber having a monomonal particle size distribution and a weight average particle size diameter between about 0.05 and about 0.5 micron, and wherein said second superstrate comprises styrene and acrylonitrile in a ratio between about 80:20 and about 60:40;
   and wherein the total rubber content of said polyblend is between about 5 and about 40 wt. %; and wherein the weight ratio of polybutadiene rubber to saturated rubber is between about 5:95 and about 30:70.

2. The polyblend of claim 1 additionally comprising: an interpolymer comprising styrene and acrylonitrile in a ratio between about 80:20 and about 60:40.

3. The polyblend of claim 1 wherein the ratio of the particle size diameter, $D_w$, of said polybutadiene rubber to the particle size diameter, $D_w$, of saturated rubber is greater than about 1:1.

4. A polyblend comprising:
   (1) a first graft copolymer comprising a first substrate and a first superstrate wherein said first substrate comprises a conjugated diene rubber having a weight average size diameter, $D_w$, between about 0.6 and about 10 microns and wherein said first superstrate comprises a monovinylidene aromatic hydrocarbon and an unsaturated nitrile; and
   (2) a second graft copolymer comprising a second substrate and a second superstrate wherein said second substrate comprises an ethylene propylene non-conjugated diene rubber having a weight average particle size diameter, $D_w$, between about 0.05 and about 1 micron, said second superstrate comprising a monovinylidene aromatic hydrocarbon and an unsaturated nitrile; and wherein said polyblend contains from about 5 to about 40 wt. % total rubber; and wherein the weight ratio of said conjugated diene rubber to said ethylene propylene non-conjugated diene rubber is between about 5:95 and about 30:70.

5. The polyblend of claim 4 wherein the weight ratio of said conjugated diene rubber to said ethylene propylene non-conjugated diene rubber is between about 10:90 and about 20:80.

6. The polyblend of claim 1 wherein the weight ratio of said conjugated diene rubber to said saturated rubber is between about 10:90 and about 20:80.

7. The polyblend of claim 1 wherein the ratio of the particle size diameter, $D_w$, of said conjugated diene rubber to the particle size diameter, $D_w$, of said saturated rubber is greater than about 1:1.

* * * * *